United States Patent
Aga

[19]

[11] Patent Number: 6,017,102
[45] Date of Patent: Jan. 25, 2000

[54] AUTOMATIC-BRAKING CONTROL SYSTEM FOR A MOTOR VEHICLE

[75] Inventor: Masami Aga, Susono, Japan

[73] Assignee: Toyota Jidosha Kabushiki Kaisha, Japan

[21] Appl. No.: 08/970,193

[22] Filed: Nov. 14, 1997

[30] Foreign Application Priority Data

Nov. 18, 1996 [JP] Japan ................................ 8-306495

[51] Int. Cl.$^7$ ................................ B60T 8/32; B60T 8/86
[52] U.S. Cl. ................................ 303/191; 303/125
[58] Field of Search ........................ 303/191, 192, 303/193, 125; 701/96, 301; 340/435, 903

[56] References Cited

U.S. PATENT DOCUMENTS

| | | | |
|---|---|---|---|
| 3,898,913 | 8/1975 | Handrickson et al. | 303/193 |
| 4,610,483 | 9/1986 | Matsumoto et al. | 303/192 |
| 5,278,764 | 1/1994 | Iizuka et al. | 303/191 |
| 5,410,484 | 4/1995 | Kunimi et al. | 180/169 |
| 5,574,644 | 11/1996 | Butsuen et al. | 180/169 |
| 5,646,841 | 7/1997 | Suzuki et al. | 303/192 |
| 5,916,062 | 6/1999 | Siepker | 303/191 |

FOREIGN PATENT DOCUMENTS

| | | |
|---|---|---|
| 4-57474 | 5/1992 | Japan . |
| 5-39011 | 2/1993 | Japan . |
| 6-298022 | 10/1994 | Japan . |

Primary Examiner—Mark T. Le
Assistant Examiner—Robert A. Siconolfi
Attorney, Agent, or Firm—Finnegan, Henderson, Farabow, Garrett & Dunner, L.L.P.

[57] ABSTRACT

An automatic-braking control system for a motor vehicle, wherein an obstacle ahead of the vehicle is sensed so as to automatically brake the vehicle. In a case where the vehicle has been brought into a substantially stopped state by the automatic braking, a braking force for keeping the stopped state of the vehicle is determined, and the vehicle is subjected to a braking control with the determined braking force. In a case where the vehicle has resumed its drive and has reached a vehicle speed of predetermined value, the braking force is released. Thus, the vehicle is permitted to be driven as intended by the driver thereof.

2 Claims, 10 Drawing Sheets

AUTOMATIC-BRAKING CONTROL SYSTEM FOR A MOTOR VEHICLE

BACKGROUND OF THE INVENTION

1. Field of the Invention

The present invention relates to an automatic-braking control system for a motor vehicle in which, when an obstacle ahead of the vehicle has been sensed, automatic braking is applied in accordance with circumstances on that occasion.

2. Description of the Prior Art

Heretofore, in order to prevent the collision accident of a motor vehicle or the rear-end collision accident thereof, there has been proposed technology wherein an obstacle ahead of the vehicle is sensed, and wherein any warning is issued to the driver of the vehicle or the vehicle is automatically braked when the vehicle and the obstacle have approached up to a distance (a threshold value) at which the further approach thereof without any evasive action is decided or judged dangerous.

By way of example, the official gazette of Japanese Patent Application Laid-open No. 298022/11994 discloses a system wherein automatic braking is executed on the basis of the distance of the pertinent vehicle from an object ahead (a preceding vehicle) as found by a radar (that is, the distance between the two vehicles), the relative speed between the vehicles, and the speed of the pertinent vehicle. More concretely, in this system, a first threshold value at which the rear-end collision of the pertinent vehicle against the preceding vehicle can be prevented by braking, and a second threshold value at which the rear-end collision against the preceding vehicle can be prevented by a steering action, are calculated on the basis of the speed of the pertinent vehicle, the distance between the vehicles and the relative speed between them. Herein, even when the detected distance between the vehicles is less than the first threshold value, the braking is not executed as long as this distance is greater than the second threshold value, and when it has become less than or equal to both the first and second threshold values, the braking is executed for the first time. Thus, the prevention of the rear-end collision as intended by the driver is achieved.

Prior-art automatic-braking control systems including the aforecited system, however, are problematic as stated below. Even after the vehicle has been stopped by the automatic braking, this automatic braking continues to work. In case of an excessive braking force, accordingly, the vehicle is difficult to move forward (or it is sometimes incapable of movement) in spite of an accelerator pressing action done by the driver.

As a method for eliminating the problem, it is considered that the automatic braking is released after having worked for a predetermined time period. However, the automatic braking is executed irrespective of the driver's intention. Accordingly, the method has the drawback that, even when the driver intends to start the vehicle again before the release of the automatic braking, he/she fails because the automatic braking is working yet.

Another countermeasure considered is a method which releases the automatic braking upon detecting that the driver has stepped on an accelerator pedal. Herein, even in a case where the driver has erroneously pressed the accelerator pedal with the deceleration of the vehicle based on the automatic braking, the accelerator pressing action is detected as the braking releasing condition. Accordingly, this method has the drawback that the automatic braking is released in spite of being originally required.

SUMMARY OF THE INVENTION

The present invention has been made in view of the problems of the prior art as stated above, and it has for its object to provide an automatic-braking control system for a motor vehicle in which, after the vehicle has been stopped by automatic braking, the automatic braking can be appropriately released as intended by the driver of the vehicle.

The present invention has achieved the object by an automatic-braking control system for a motor vehicle as has its purport illustrated in FIG. 1. The control system is constructed having obstacle sensing means for sensing an obstacle ahead of the vehicle, so as to automatically brake the vehicle when the obstacle has been sensed under a predetermined condition. Stop decision means comprised in the control system decides that the vehicle has been substantially stopped after the working of the automatic braking. Subsequently, braking-force determination means determines a braking force for keeping the vehicle stopped. Further, braking-force control means subjects the vehicle to a braking control with the braking force determined by the braking-force determination means, when the stop of the vehicle has been decided by the stop decision means. On the other hand, drive decision means decides that the vehicle has resumed its drive and has reached a vehicle speed of predetermined value. Then, release means releases the braking force when the resumption of the drive of the vehicle has been decided by the drive decision means.

According to the present invention, after the motor vehicle has been stopped by the automatic braking, the braking force for keeping the stopped state of the vehicle is set to be smaller than a braking force for avoiding the collision of the vehicle against the obstacle, for example, it is set as the minimum braking force required for keeping the stopped state of the vehicle. Accordingly, in a case where the driver intends to start the vehicle again, the braking is quickly released to smoothen the start. Thus, it is possible to realize the drive of the vehicle complying with the driver's intention.

In a more preferable aspect of performance, the automatic-braking control system further comprises sloping-state detection means. This means detects the sloping state of a road. Herein, the braking-force determination means determines the braking force for keeping the stopped state of the vehicle, on the basis of the detected sloping state. Thus, even in a case where the slope of the road is abrupt, the stopped state of the vehicle can be reliably kept.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

Now, more practicable aspects of performance of the present invention will be described in detail with reference to the drawings.

Figure 1:
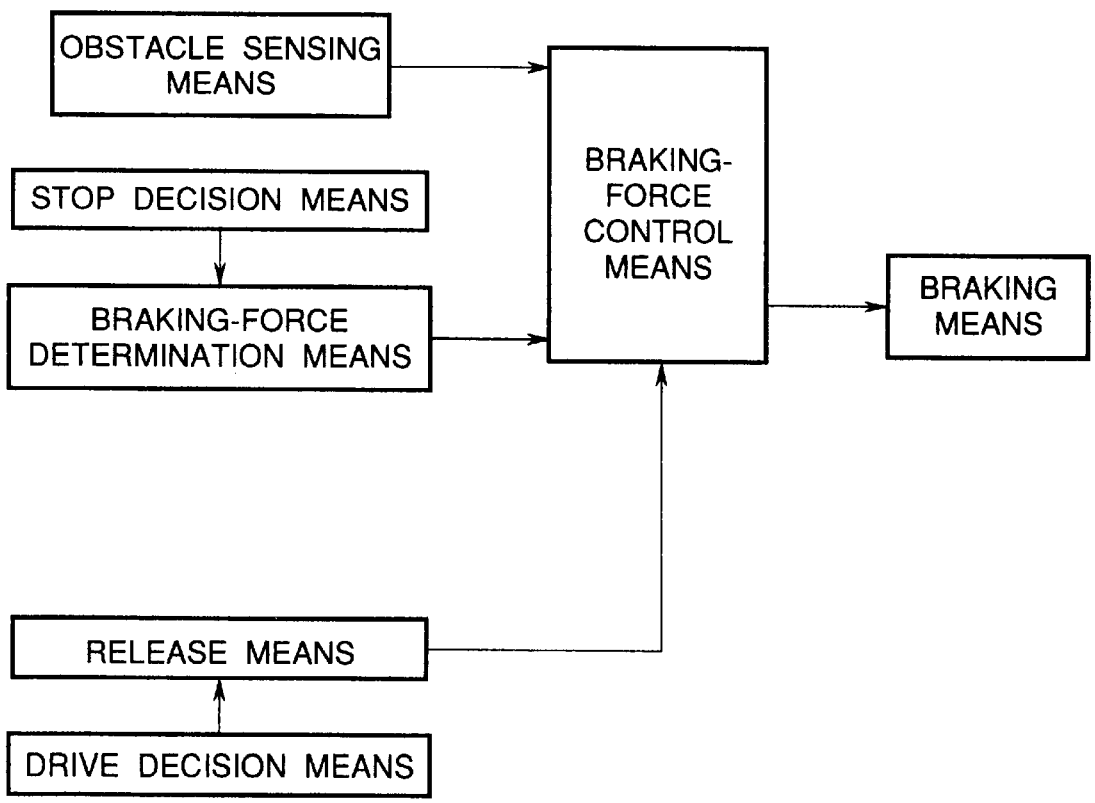
FIG. 1 is a block diagram showing the purport of the present invention.
Figure 2:
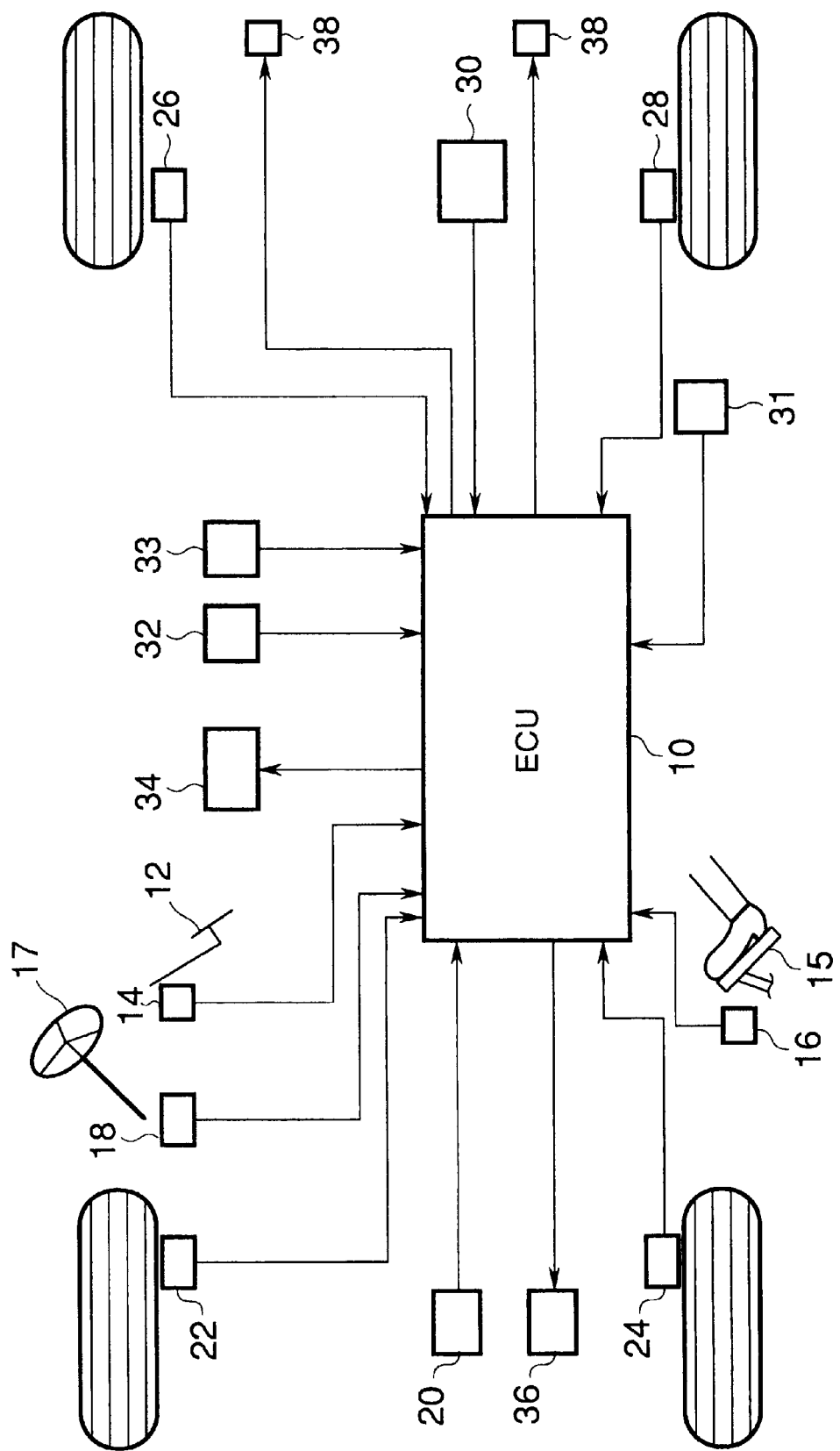
FIG. 2 is a schematic constructional diagram of an automatic-braking control system to which the present invention is applied.

FIG. 2 is a schematic constructional diagram of an automatic-braking control system for a motor vehicle to which the present invention is applied.

Referring to FIG. 2, an electronic control unit (ECU) 10 is supplied with the ON or OFF signal of a brake switch 14 for detecting that the driver of the vehicle has trodden a brake pedal 12, a signal from an accelerator sensor 16 for detecting that the driver has pressed an accelerator pedal 15, a signal from a steering angle sensor 18 for detecting the steering angle α of a steering wheel 17, a signal from a radar (obstacle sensing means) 20 for acquiring a distance Lc from the vehicle to an obstacle, signals from wheel speed sensors 22~28 for detecting the speed V of the vehicle, a signal from a yaw rate sensor 30 as information for evaluating a yaw rate γ, a signal from a slope sensor 31 for detecting the slope or gradient of a road, and signals from a G sensor 32 and a G switch 33 for detecting the magnitude of a shock ascribable to the collision of the vehicle, in terms of the acceleration G of the vehicle.

The ECU 10 acquires and estimates obstacle information on the basis of the input signals. When the ECU 10 has judged the necessity of warning, it issues the command of moderate braking for warning to a brake actuator 34, and it actuates an alarm device 36. In addition, the ECU 10 lights up brake lamps 38 in order to notify a succeeding vehicle of the moderate braking (by reason that, although the driver does not tread the brake pedal 12, the moderate braking is applied). Besides, when the pertinent vehicle has approached the obstacle still further, the ECU 10 issues the command of full braking to the brake actuator 34 so as to evade the collision. Also, when the vehicle has fallen into a substantially stopped state, the ECU 10 determines a braking force for keeping the stopped state of the vehicle, and issues a command to the brake actuator 34 so as to keep the stop with the braking force. On the other hand, in a case where the driver has pressed the accelerator pedal 15 with the intention of resuming the drive of the vehicle, the ECU 10 issues a signal for releasing the braking force, to the brake actuator 34 when the vehicle speed V has reached a predetermined value.

In this manner, the ECU 10 fulfills the functions of stop decision means for calculating the vehicle speed V on the basis of the signals from the wheel speed sensors 22~28 and for deciding the substantial stop of the vehicle, and drive decision means for deciding the resumption of the drive of the vehicle. It also fulfills the functions of braking-force determination means for determining the braking force, braking-force control means for keeping the stop with the braking force, and release means for releasing the braking force.

Next, the operation of the first aspect of performance of the present invention will be described with reference to the flow charts of FIGS. 3~6.

Figure 3:
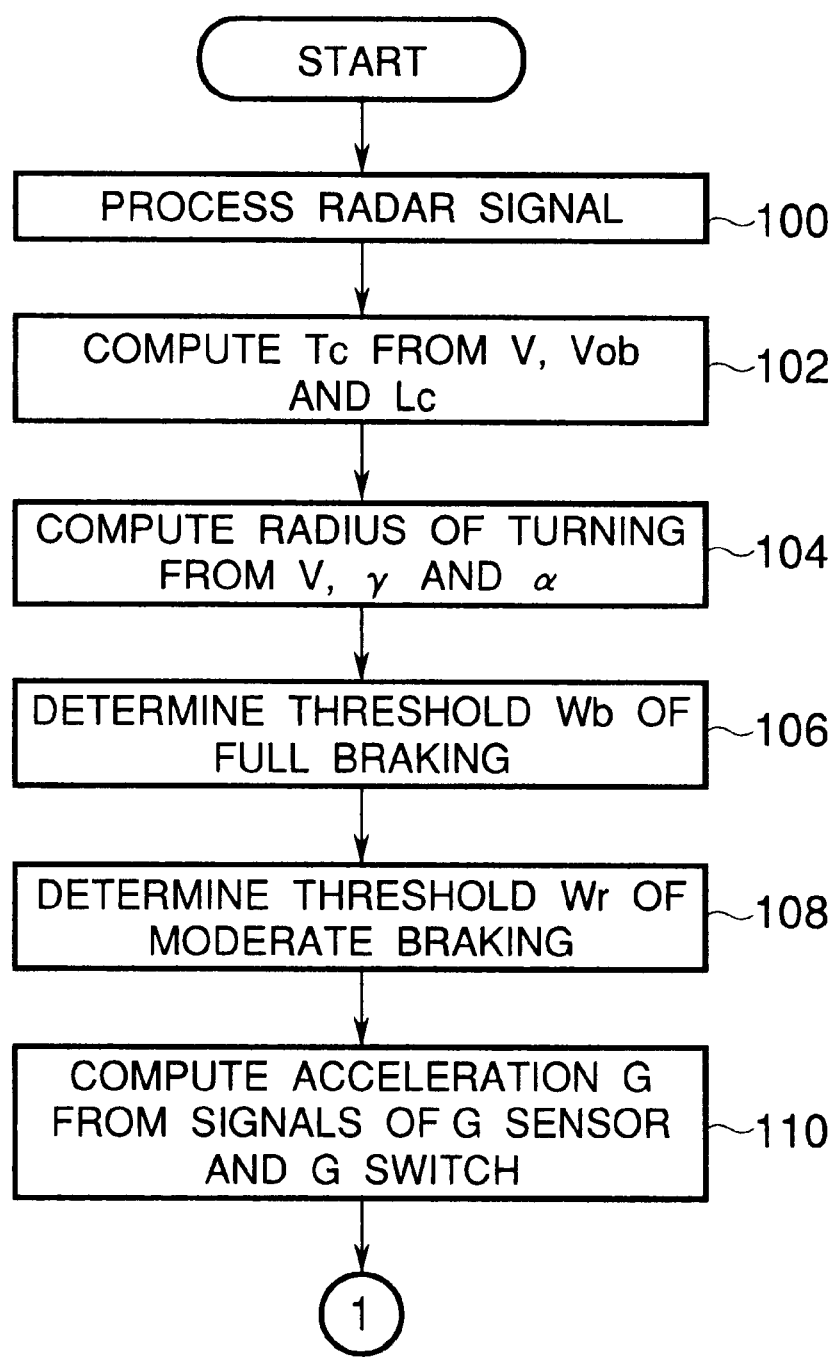
FIG. 3 is a flow chart showing the first part of the control of a first aspect of performance of the present invention.

First, at a step 100 in FIG. 3, the signal of the radar 20 is input. This signal is processed in the ECU 10, thereby to obtain the distance (relative distance) Lc from the vehicle to the obstacle. At a step 102, the ECU 10 acquires the speed V of the vehicle itself from the signals of the wheel speed sensors 22~28, and calculates the approaching speed (relative speed) Vob of the obstacle from the information of the relative distance Lc. Also, the ECU. computes an anticipated arrival time period Tc (in which the vehicle would arrive at the obstacle without any evasive action) from the information items V and Vob and the sensed distance Lc.

In this aspect of performance, whether or not the obstacle is an oncoming vehicle is judged, and the anticipated arrival time period Tc is calculated in either of two ways as stated below, in accordance with the result of the judgement.

Figure 6:
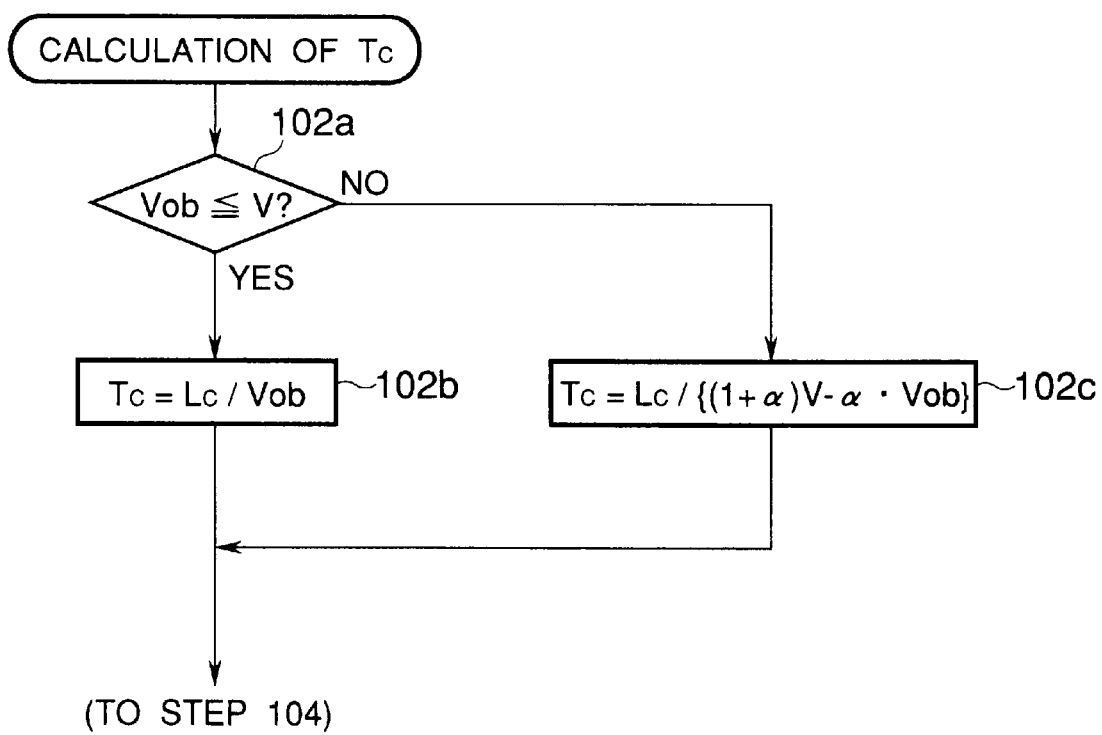
FIG. 6 is a flow chart showing the last part of the control of the first aspect of performance.

That is, as indicated in FIG. 6, whether or not the relative speed Vob is less than or equal to the vehicle speed V is first checked at a step 102a. Here, when an inequality Vob≦V holds, it is judged that the obstacle is either a stationary obstacle or another vehicle in front advancing in the same direction as that of the pertinent vehicle (in other words, a preceding vehicle). Subsequently, the control flow proceeds to a step 102b, at which the anticipated arrival time period Tc is calculated in conformity with the following equation (1):

$$Tc = Lc/Vob \tag{1}$$

On the other hand, when the inequality Vob≦V does not hold at the step 102a, the relative speed Vob is greater than the vehicle speed V, and hence, it is meant that the obstacle is coming nearer toward the pertinent vehicle. It is accordingly judged that the obstacle is the oncoming vehicle, and the anticipated arrival time period Tc is calculated in conformity with the following equation (2) at a step 102c:

$$Tc = Lc/\{(1+\alpha) \times V - \alpha \times Vob\} \tag{2}$$

Here, symbol α denotes a correction coefficient for the oncoming vehicle, and satisfies 0<α<1.

Referring back to FIG. 3, at a step 104 in FIG. 3, the signal of the steering angle α is input from the steering angle sensor 18, and the signal of the yaw rate γ is input from the yaw rate sensor 30. Besides, the radius of turning R is computed from the vehicle speed V and the yaw rate γ. Incidentally, (radius of turning R)=(vehicle speed V)/(yaw rate γ) holds here.

Next, a step 106 serves to determine a full braking threshold Wb which is such a threshold value that the full braking is executed when the anticipated arrival time period Tc has fallen below this value.

Figure 7:
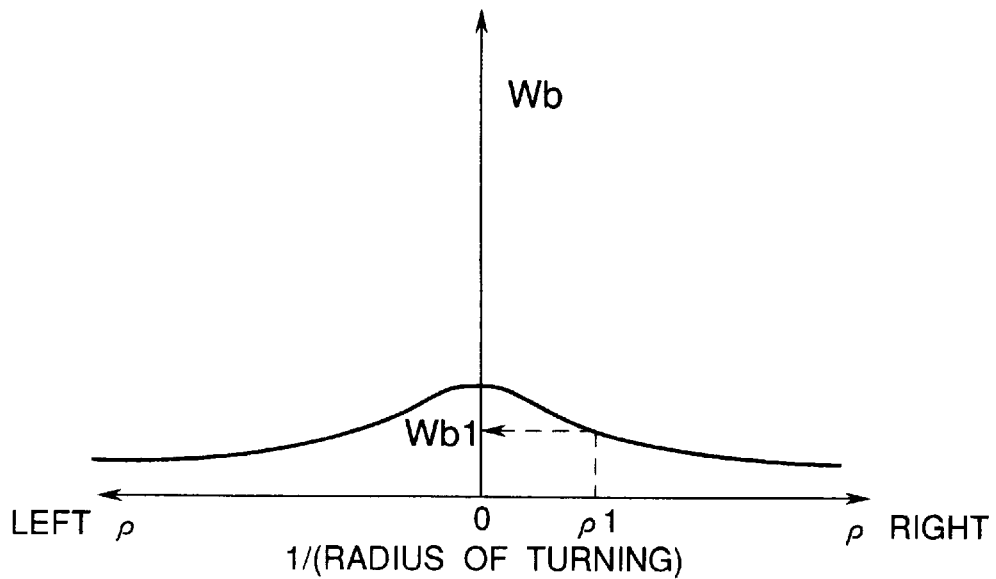
FIG. 7 is a graph showing the threshold of full braking.

The full braking threshold Wb is determined in conformity with the graph of FIG. 7 by the use of the inverse number ρ of the radius of turning R computed above. In FIG. 7, the axis of abscissas represents the inverse number ρ of the radius of turning R. Symbol 0 in the middle of the graph denotes a case where the radius of turning R is infinity, that is, where the vehicle makes a straight drive. The right side of the graph indicates a right bend, and the left side a left bend. In addition, the axis of ordinates represents the threshold value Wb. Assuming now that the inverse number ρ of the radius of turning R is ρ1, a value Wb1 on the graph corresponding thereto is the threshold value (full braking threshold) Wb in this case.

Further, a step 108 serves to determine a moderate braking threshold Wr which is such a threshold value that the moderate braking for warning is executed when the anticipated arrival time period Tc has fallen below this value. Likewise to the full braking threshold Wb, the value Wr is determined in conformity with the graph of FIG. 8 by the use of the inverse number ρ of the radius of turning R computed above.

Figure 8:
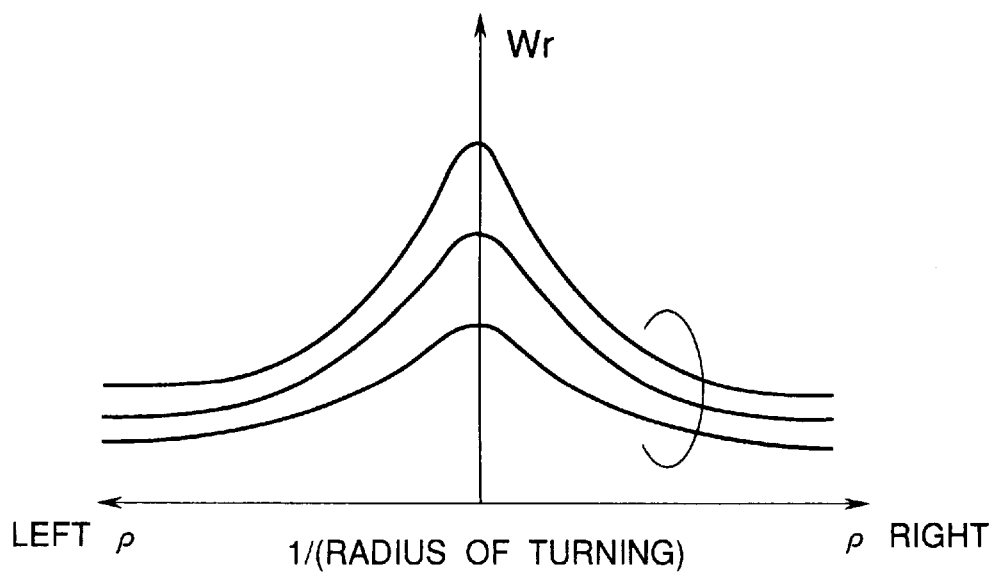
FIG. 8 is a graph showing the threshold of moderate braking.

Incidentally, the depiction of a plurality of graphic curves in FIG. 8 indicates that the timing of the execution of the moderate braking can be corrected somewhat earlier or later in accordance with the driver's taste, etc. Which of the graphic curves is to be used, is selected with a dial or the like by the driver beforehand. Besides, although the graphs of FIGS. 7 and 8 are expressed by the curves, they may well be expressed by polygonal lines.

Subsequently, at a step 110 in FIG. 3, the acceleration G of the vehicle for detecting the magnitude of the shock ascribable to the actual collision of the vehicle is computed on the basis of the signals supplied from the G sensor 32 and the G switch 33.

Figure 4:
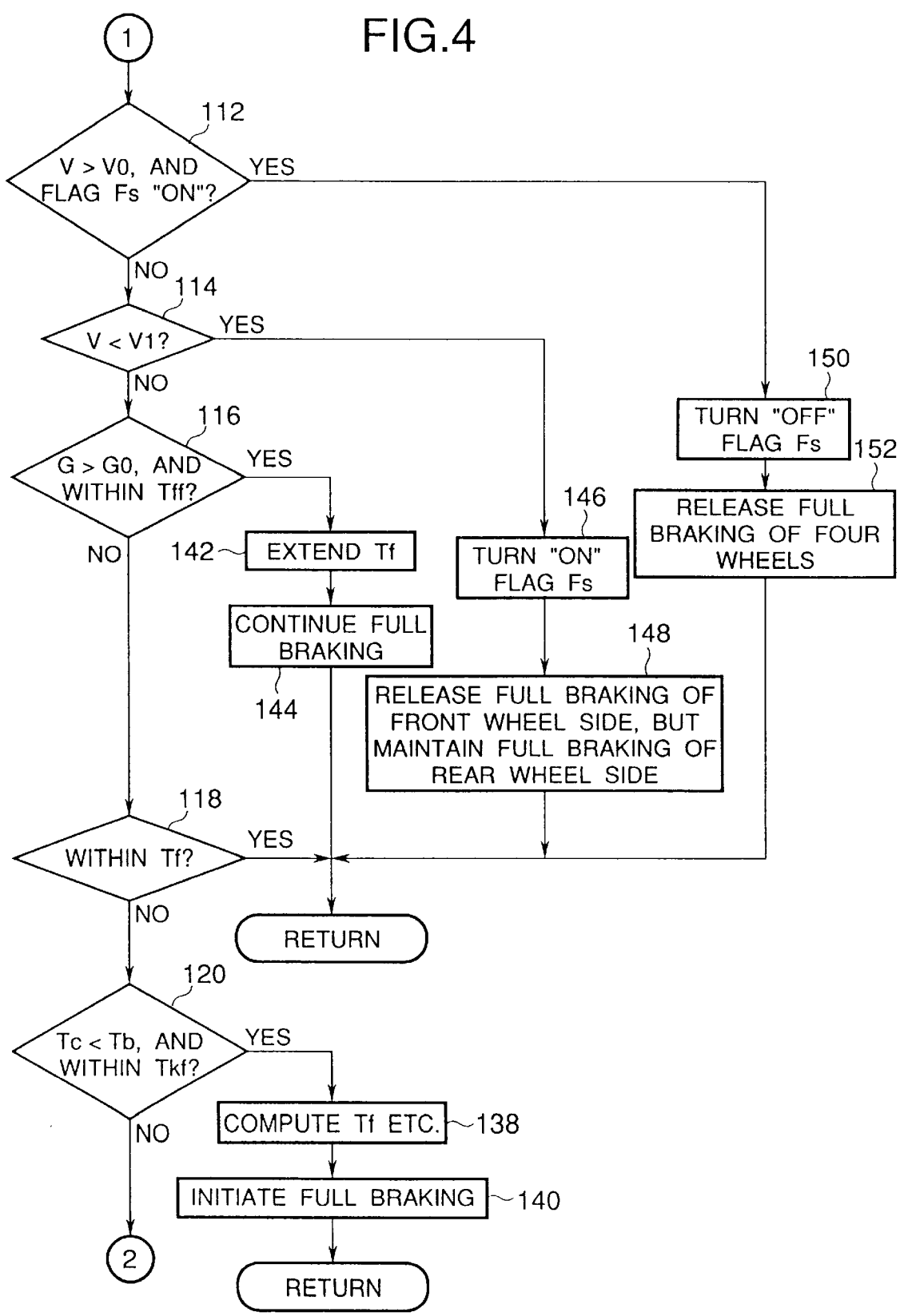
FIG. 4 is a flow chart showing the second part of the control of the first aspect of performance.
Figure 5:
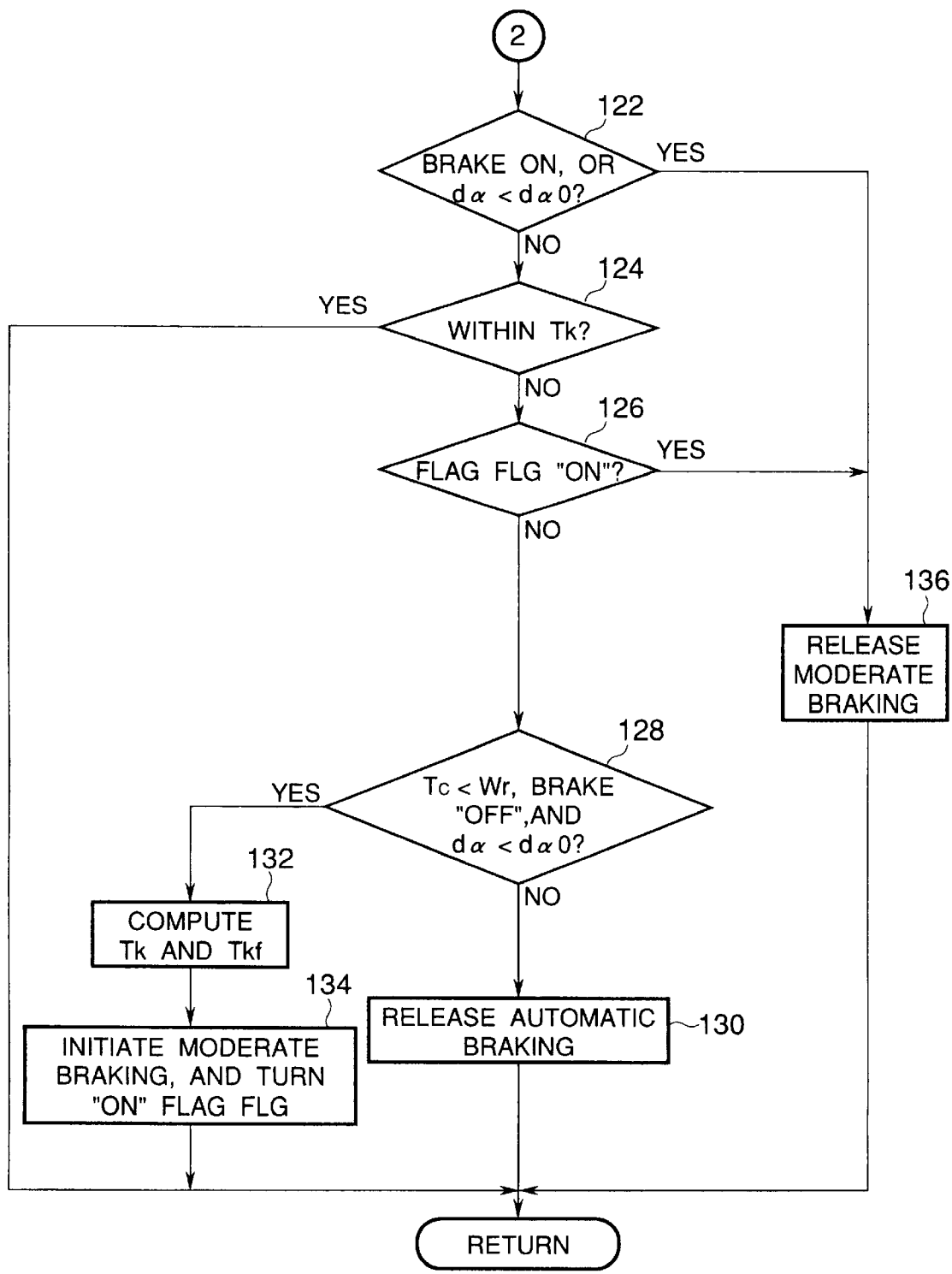
FIG. 5 is a flow chart showing the control of the third part of the first aspect of performance.

The step 110 is followed by a control flow shown in FIG. 4. At a step 112, the ECU 10 judges whether or not the driver is intending to start the vehicle after the vehicle has been stopped once by the full braking in order to avoid the collision against the obstacle. That is, the ECU 10 judges if the vehicle speed V is greater than a low vehicle-speed threshold V0, and if a temporary stop flag Fs is "ON". When these conditions are not met, the control flow proceeds to the next step 114.

At the step 114, the ECU 10 judges whether or not the vehicle is in a substantially stopped state owing to the full braking. That is, the ECU 10 judges if the vehicle speed V is less than a lower-limit vehicle-speed detection value V1 (V1<V0). In a case where this condition is not met, the control flow proceeds to the next step 116.

The step 116 serves to judge whether or not the vehicle has been heavily shocked by a collision or the like in spite of the application of the full braking. That is, the ECU 10 serves to judge if the acceleration G calculated at the step 110 is greater than a shock threshold G0, and if the anticipated arrival time period Tc is within that term of validity Tff of a full braking flag which indicates a situation where the full braking under execution needs to be continued as it is. In a case where these conditions are not met, the control flow proceeds to a step 118.

The step 118 serves to judge whether or not the anticipated arrival time period Tc is within that duration Tf of the full braking for which the full braking is continued. In a case where the time period Tc is not within the full braking duration Tf, the control flow proceeds to the next step 120.

At the step 120, the ECU 10 judges whether or not the full braking is necessary due to the further approach of the obstacle. That is, the ECU judges if the anticipated arrival time period Tc is less than the full braking threshold Wb, and if the time period Tc is within the term of validity Tkf of a warning braking flag. In a case where these conditions are not met, the step 120 is followed by a step 122 in FIG. 5.

At the step 122, the ECU 10 judges whether or not the driver is treading the brake pedal 12 or turning the steering wheel 17 as a collision evading action. That is, the ECU 10 judges if the brake switch 14 is ON, or if a steering velocity dα being a speed at which the steering wheel 17 is manipulated is greater than a steering velocity threshold dα0 (that is, if the driver is rapidly turning the steering wheel 17). In a case where either condition is not met, the control flow proceeds to the next step 124.

The step 124 serves to judge whether or not the anticipated arrival time period Tc is within that duration Tk of the moderate braking for which the moderate braking is continued. In a case where the time period Tc is not within the moderate braking duration Tk, the control flow proceeds to the next step 126.

The step 126 serves to judge whether or not a flag FLG is "ON", this flag FLG indicating to release the moderate braking once in a case where the moderate braking duration Tk has lapsed within the term of validity Tkf of the warning flag. When the flag FLG is "OFF", the control flow proceeds to the next step 128.

The step 128 serves to check if the moderate braking for warning is necessary, that is, if the driver is performing no evasive action in spite of the existence of the obstacle within a range in which the moderate braking is required. More specifically, the necessity of the moderate braking is decided in a case where the anticipated arrival time period Tc is less than the moderate braking threshold Wr, where the brake switch 14 is "OFF" (that is, the driver is not treading the brake pedal 12 and is not performing the braking evasive action), and where the steering velocity dα of the steering wheel 17 is less than the steering velocity threshold dα0 (that is, the driver is not performing a steering evasive action). In a case where the moderate braking is not necessary as the result of the judgement, the control flow proceeds to the next step 130.

At the step 130, in a case where the automatic braking control has been executed till then, this control is released, and the actuations of the alarm device 36 and the brake lamps 38 are released. On the other hand, in a case where the automatic braking control has not been executed from the beginning, nothing is actually done here.

Figure 9:
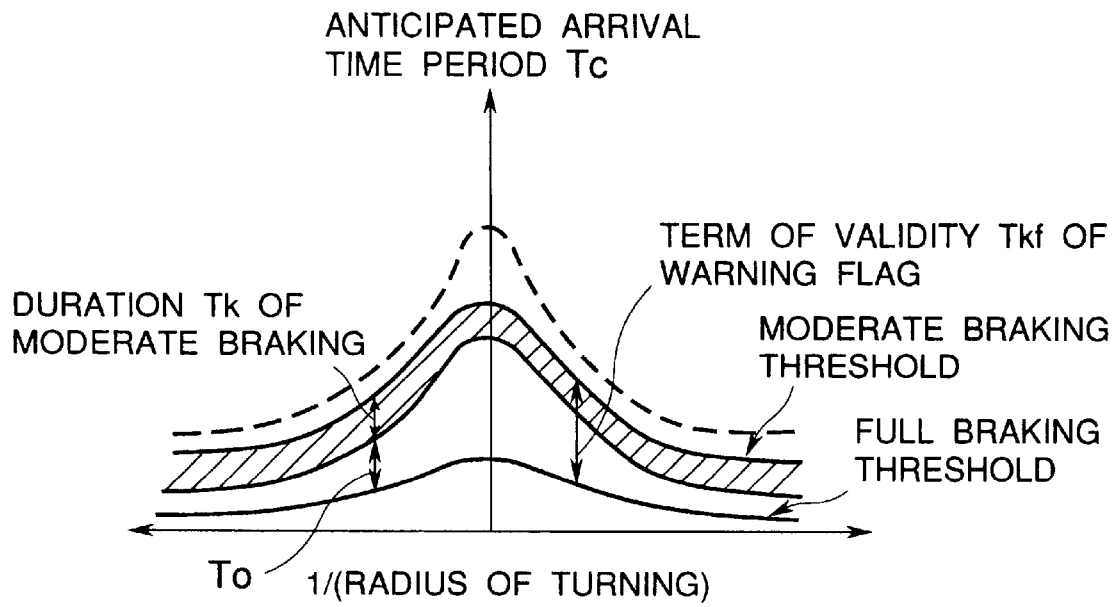
FIG. 9 is a graph showing the duration of the moderate braking and the term of validity of a warning flag.

In a case where the necessity of the moderate braking has been judged at the step 128, the control flow proceeds to a step 132 for computing the moderate braking duration Tk and the term of validity Tkf of the warning flag as shown in FIG. 9. At the next step 134, the moderate braking is initiated, the alarm device 36 and the brake lamps 38 are actuated, and the flag FLG is turned "ON".

Subject to the judgement of the step 122 that, in consequence of the moderate braking for warning, the driver has executed the evasive action based on the braking or the steering, the control flow proceeds to a step 136. At this step 136, the moderate braking duration Tk and the warning flag Fk are reset to release the moderate braking. Besides, the actuations of the alarm device 36 and brake lamps 38 are released, and the flag FLG is turned "OFF".

In a case where the driver has not performed any evasive action in spite of the execution of the moderate braking and where the anticipated arrival time period Tc has been judged within the moderate braking duration Tk at the step 124, the moderate braking is continued as it is.

Meanwhile, in a case where, as indicated at symbol To in FIG. 9, the moderate braking duration Tk has lapsed even within the term of validity Tkf of the warning flag, and it is judged from the "ON" status of the flag FLG at the step 126 that the moderate braking has been executed till then, the control flow proceeds to the step 136, at which the moderate braking is released once or temporarily.

Figure 10:
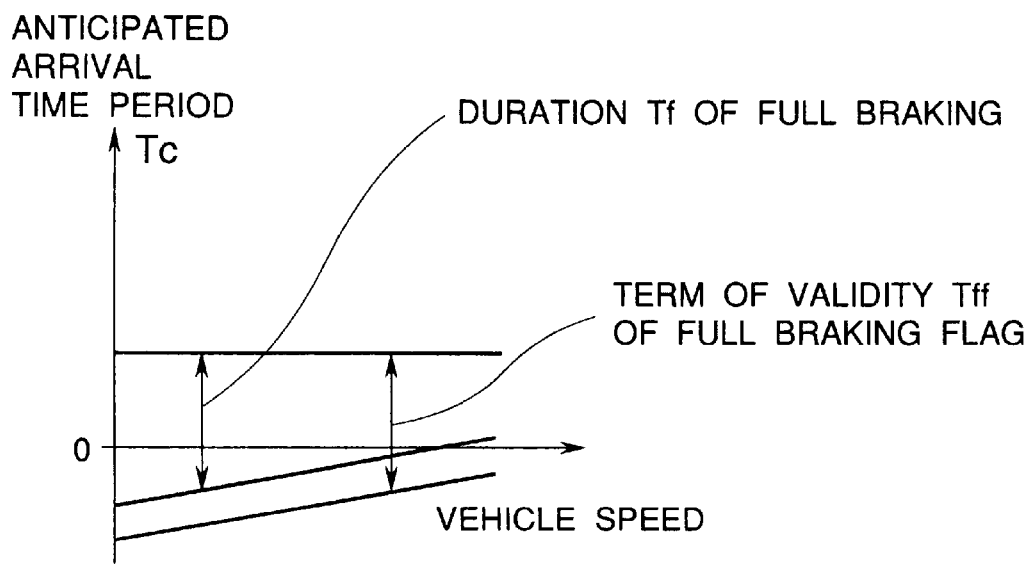
FIG. 10 is a graph showing the duration of the full braking and the term of validity of a full braking flag.

Thereafter, in a case where the obstacle has come still nearer to the vehicle and where the necessity of the full braking has been judged at the step 120 in FIG. 4, the full braking duration Tf and the term of validity Tff of the full braking flag are computed on the basis of the graph of FIG. 10 at a step 138. Subsequently, at a step 140, the full braking is initiated, and the alarm device 36 and the brake lamps 38 are actuated.

In case of the decision of the step 118 that the anticipated arrival time period Tc is within the full braking duration Tf, the full braking is continued as it is.

In a case where, in spite of the continuation of the full braking, it has been decided at the step 116 that the vehicle acceleration G is greater than the shock threshold G0 and that the anticipated arrival time period Tc is within the term of validity Tff of the full braking flag, it is judged that the vehicle has collided against the obstacle. Subsequently, at a step 142, the full braking duration Tf and the term of validity Tff of the full braking flag are extended to the infinity. Besides, in order to avoid suffering and inflicting damage ascribable to the secondary collision of the vehicle, the ECU 10 operates at a step 144 to continue the full braking and to keep the alarm device 36 and the brake lamps 38 actuated.

On the other hand, in a case where the vehicle speed V has been lowered by the full braking and has been decided at the step 114 to be less than the lower-limit value V1 of the vehicle speed detection, it is judged that the vehicle is in the substantially stopped state. Accordingly, the step 114 is followed by a step 146, at which the temporary stop flag Fs is turned "ON". At the next step 148, the full braking of the front wheel side of the vehicle is released, and the full braking is continued only on the rear wheel side. Thus, the stopped state of the vehicle is kept, but a force for stopping the vehicle becomes lower than in case of applying the full braking also to the front wheels. More specifically, a driving force for the vehicle is small in the ordinary drive mode of pressing the accelerator pedal 15. In the this state, therefore, the braking force of the rear wheels is greater than the driving force, and the stopped state of the vehicle is kept. On this occasion, when the driver has pressed the accelerator pedal 15 with the intention of really moving the vehicle, the driving force comes to exceed the braking force of the rear wheels, and the vehicle begins to move. This situation is just correspondent to the state in which the vehicle has been started with a parking brake kept working. Thus, in the first aspect of performance, the "braking force for subjecting only the rear wheels to the full braking" is determined as a "braking force for keeping the vehicle stopped" stated in claim 1.

In case of the judgement of the step 112 that the vehicle speed V is greater than the low vehicle-speed threshold V0 and that the temporary stop flag Fs is "ON", it is decided that the driver has the intention of starting the vehicle, with the result that the vehicle speed V has become greater than the low vehicle-speed threshold V0 (in spite of the braking of the rear wheels). Subsequently, the temporary stop flag Fs is turned "OFF" at a step 150. Further, the full braking of all the wheels is released at a step 152 (in actuality, the full braking of the front wheels has already been released, so that the full braking of the rear wheels is released at this step). In consequence, the vehicle is entirely released from the full braking, and it is permitted to start with ease and to be driven as usual. By the way, the release of the braking is effected under the state under which the vehicle has already been started, and hence, it proceeds slowly (so as not to afford a sense of unnaturalness to the driver).

In this aspect of performance, in the case where the obstacle has approached the vehicle below the full braking threshold Wb, the full braking of the four wheels is applied in order to avoid the collision. Thereafter, immediately before the stop, the full braking of the front wheel side is released to weaken the braking force. It is therefore possible to mitigate the roll-back of the vehicle attributed to the shock of a sudden stop.

Incidentally, in this aspect of performance, the full braking is maintained on only the rear wheel side immediately before the stop of the vehicle, but it may well be maintained on only the front wheel side contrariwise. Alternatively, a braking hydraulic pressure may well be set lower than in the full braking on both the front wheel side and the rear wheel side (by way of example, it may be set at ½ of a braking hydraulic pressure in the full braking on both the sides).

Next, the control of the second aspect of performance will be described.

In the first aspect of performance described above, the braking force is lowered indiscriminately irrespective of the state of a road. However, in a case where the road is not level and where the slope or gradient thereof is abrupt, the braking force needs to be controlled in consideration of the sloping state. The second aspect of performance consists in that the sloping state of the road is detected by a slope sensor or the like, whereupon the braking force is controlled in accordance with the sloping state.

Figure 11:
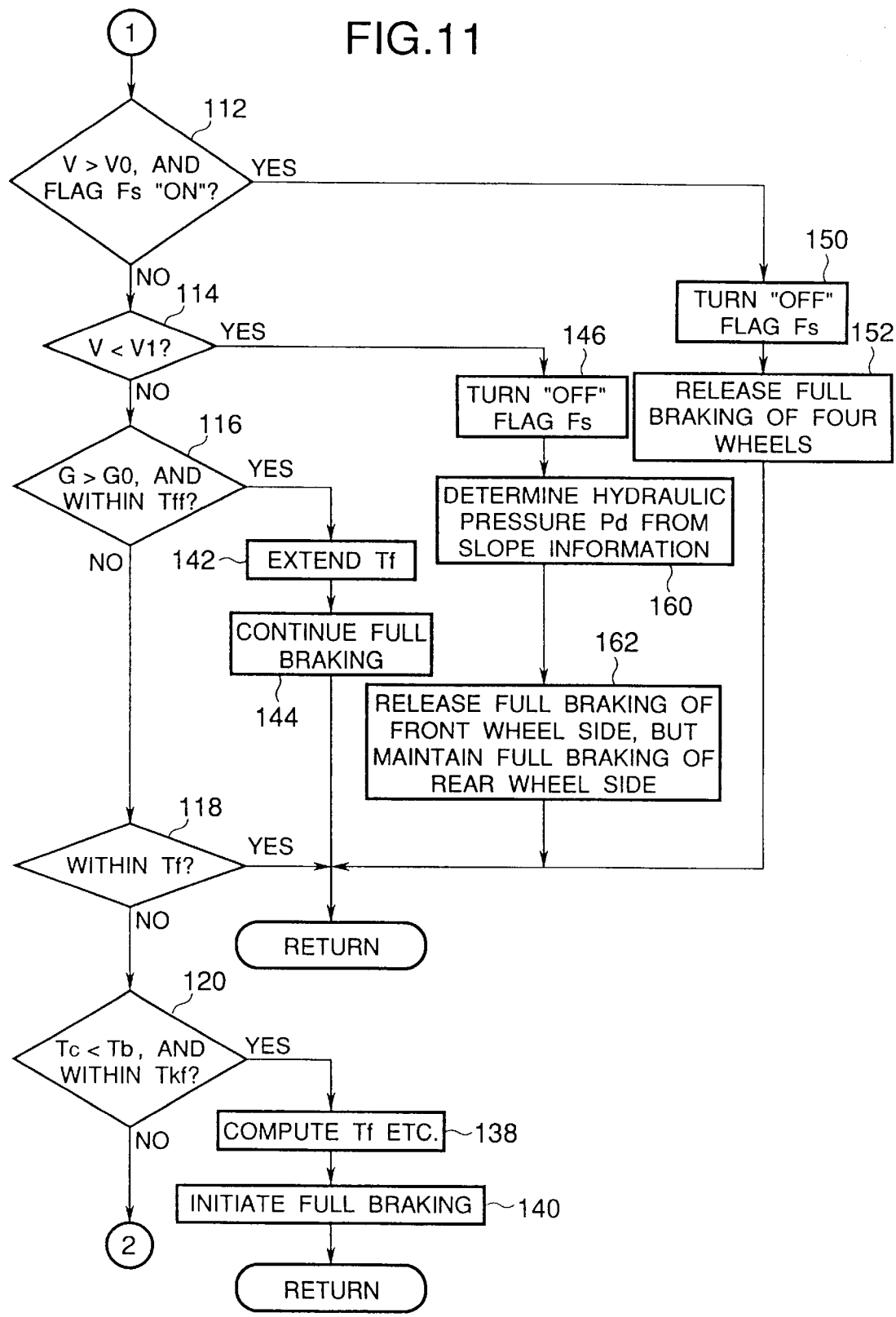
FIG. 11 is a flow chart showing the control of the second aspect of performance of the present invention.

The points of difference of the second aspect of performance from the first aspect of performance are that the step (not shown) of computing the slope of the road on the basis of the input signal from the slope sensor 31 in FIG. 2 is added at any position between the respectively adjacent ones of the steps 100 thru 110 in the flow chart of FIG. 3, and that, as shown in FIG. 11, two steps 160 and 162 are added instead of the step 148 of the flow chart in FIG. 4. The two steps 160 and 162 serves to execute for executing a braking control with a hydraulic pressure Pd which corresponds to the sloping state of the road (that is, which can generate a braking force for maintaining the stopped state of the vehicle "appropriately").

Incidentally, the slope sensor 31 is not especially restricted. When a pitch rate sensor is mounted on the vehicle, it may well be utilized. Instead of the dedicated sensor, the G sensor 32 and G switch 33 already mounted may well be used also as a slope sensor so as to utilize the outputs thereof. Further, when an altitude and a road slope are contained as the road information items in a navigation system, they can be utilized in place of the information from the slope sensor 31.

In a case where the vehicle speed V is less than the lower-limit vehicle-detection value V1 at the step 114 in the flow chart of FIG. 11, it is judged that the vehicle lies in the substantially stopped state. Subsequently, the temporary stop flag Fs is turned "ON" at the step 146.

Figure 12:
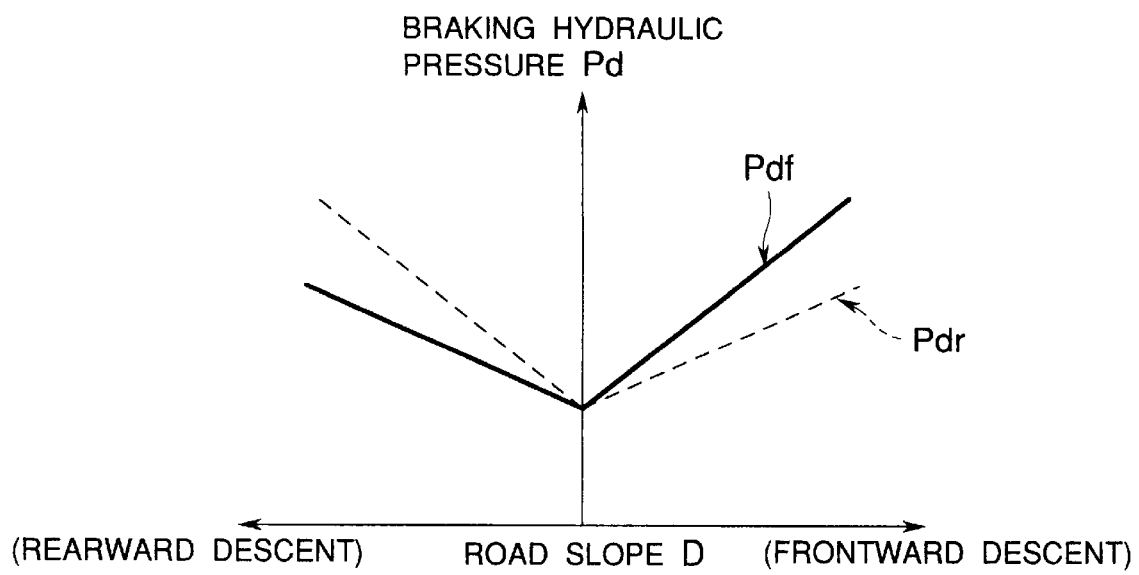
FIG. 12 is a graph showing the relationship between a road slope and a braking hydraulic pressure.

At the next step 160, the braking hydraulic pressure Pd for the front and rear wheels is determined from the road slope D with reference to a map shown in FIG. 12. As seen from FIG. 12, the characteristics of the map are so set that the braking hydraulic pressure Pd is the lowest when the road slope D is zero (horizontal), and that becomes higher as the road slope D increases more. Besides, in case of a frontward descent Dr, the ground load of the front wheel side is higher, and hence, the braking hydraulic pressure Pdf of the front wheel side is set higher. To the contrary, in case of a rearward descent, the braking hydraulic pressure Pdr of the rear wheel side is set higher. Thus, a force to stop the vehicle is effectively exerted.

Subsequently, at the step 162, the hydraulic control of the four-wheels is initiated using the hydraulic pressure Pd determined above. Thus, while the vehicle is kept stopped, the force to stop the vehicle is held lower than in the case where the full braking is applied to the four wheels. Moreover, since the hydraulic pressures of the front and rear wheels are distributed in correspondence with the sense of the slope, the force to stop the vehicle acts greatly for an abrupt slope, and the vehicle is prevented from moving even on the abrupt slope.

The other points are the same as in the first aspect of performance, and shall be omitted from description.

As described above, according to the present invention, in a case where a motor vehicle has been stopped by automatic braking, a braking force capable of keeping the stopped state is bestowed on the vehicle, and in a case where the driver's intention of starting the vehicle has been detected, the braking force is completely removed, so that the drive of the vehicle corresponding to the accelerator pressing action of the driver is permitted.

Besides, in a case where the braking force is determined in accordance with the sloping state of a road, the vehicle in the stopped state can be reliably prevented from moving.

What is claimed is:

1. An automatic-braking control system for a motor vehicle, having obstacle sensing means for sensing an obstacle ahead of the vehicle, so as to automatically brake the vehicle when the obstacle has been sensed under a predetermined condition, comprising:

stop decision means for deciding that said vehicle has been substantially stopped after working of said automatic braking;

braking-force determination means for determining a braking force for keeping said vehicle stopped;

braking-force control means for subjecting said vehicle to a braking control with the braking force determined by said braking-force determination means, when the substantial stop of said vehicle has been decided by said stop decision means;

re-drive decision means for deciding resumption of a drive that said vehicle has resumed its drive and a vehicle speed has reached a predetermined value; and release means for releasing said braking force when the resumption of the drive has been decided by said re-drive decision means.

2. An automatic-braking control system for a motor vehicle as defined in claim 1, further comprising sloping-state detection means for detecting a sloping state of a road, wherein said braking-force determination means determines said braking force for keeping said vehicle stopped, on the basis of the detected sloping state.

* * * * *